Jan. 14, 1947. D. GARDNER 2,414,295
PURIFICATION OF SELENIUM
Filed Jan. 21, 1943
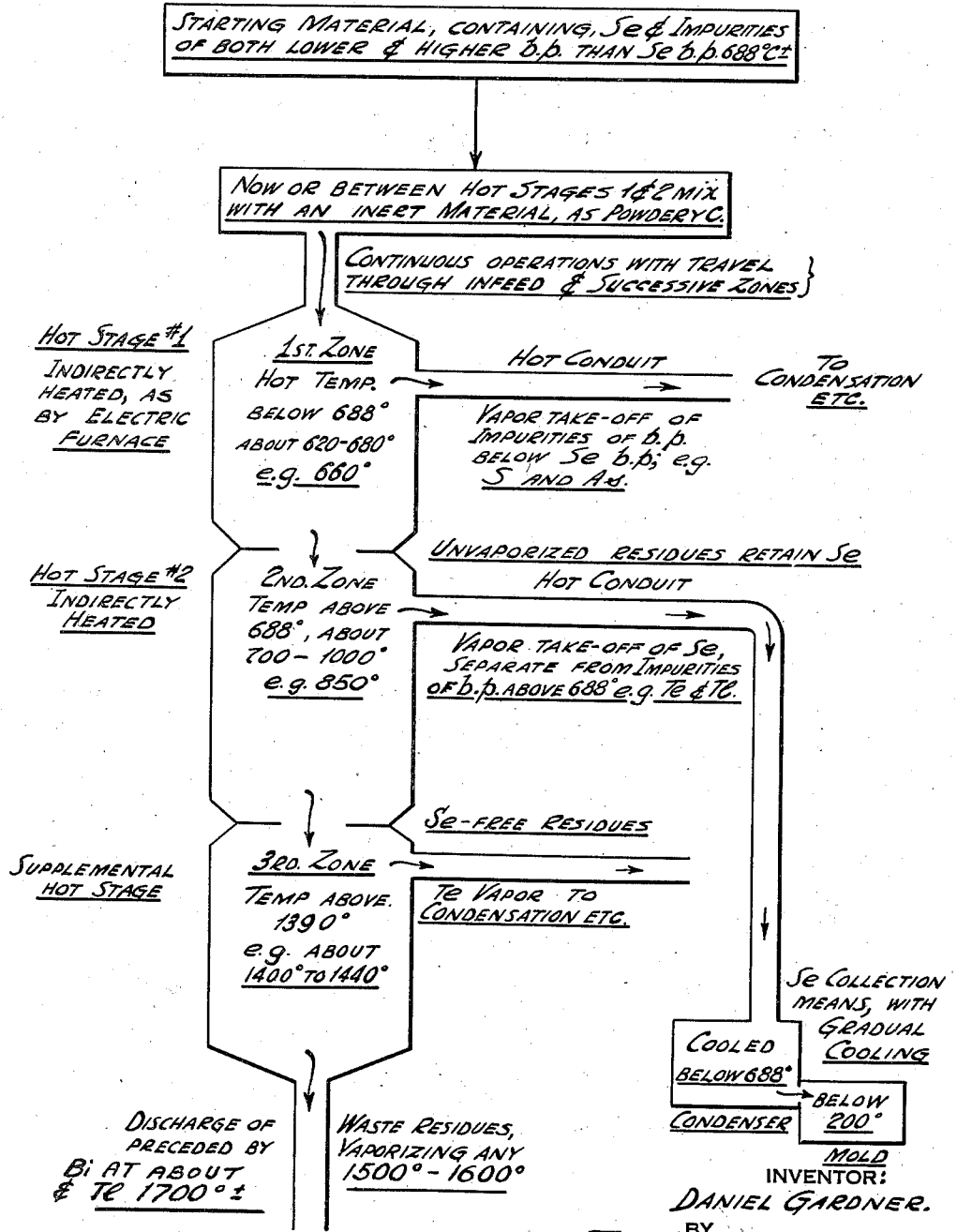
INVENTOR:
DANIEL GARDNER.
BY Morrison, Kennedy & Campbell, ATTORNEYS.

Patented Jan. 14, 1947

2,414,295

UNITED STATES PATENT OFFICE 2,414,295

PURIFICATION OF SELENIUM

Daniel Gardner, New York, N. Y.

Application January 21, 1943, Serial No. 473,116

10 Claims. (Cl. 23—209)

This invention pertains to the purification of selenium, and comprises more particularly a process for treating impure or commercial selenium to produce the highly pure substance, by steps of separation or elimination.

Commercial selenium may contain impurities of various sorts, as will be further referred to, in the order of about 2 percent up to much higher, even 18 percent or more, whereas, by the present invention it is possible to obtain solid selenium of substantially chemical purity, at least of the order of 99.9 and even up to about 99.98 percent. It is believed that the maximum purity heretofore practically obtainable has been not over 99.5 percent, but by unsatisfactory methods including chemical steps in an extensive series, involving many manipulations and high cost of process, and unreliability of result. Moreover, the differences between a purity of 98 percent, or even up to 99.5 percent, on the one hand, and on the other hand about 99.9 percent or higher, constitutes an extremely material and critical difference in a practical or industrial sense, especially for certain important uses or functions of the selenium material. Such uses include selenium in photo-responsive or selenium cells, wherein impingement of light accentuates electric conductivity; and employment as the coatings of filaments or other elements of rectifiers or other audions or electronic tubes, whereby electron flow through space is promoted. Indeed, it is notorious that in respect to these and certain related and other subjects of development the arts have suffered from the lack of adequate purity of the available selenium substance; and this need has long presented a problem the solution of which by an industrially practical system is the general and main object of the present invention. A further object is to avoid the elaborate character and other drawbacks of chemical treatment, using baths and low temperatures, to produce purified selenium.

Other and specific objects and advantages will be explained in the hereinafter presented description of one or more illustrative embodiments of the invention or will be understood by those conversant with the subject. To the attainment of such objects and advantages the present invention consists in the novel process for the purification of selenium and the novel features of process step, apparatus and product as hereinafter elucidated or claimed.

Selenum and the related elements sulfur and tellurium, in periodic group VI, are non-metals or metalloids; and selenium appears in several allotropic forms and may have up to 8 atoms in its molecule, with valence of 2 or 4 or 6. Its atomic number 34 is midway between those of sulfur 16 and tellurium 52, and many of its properties are similarly intermediate of these other metalloids, selenium having a melting point of about 200° and a boiling point of about 688°. Throughout this specification centigrade temperatures are employed.

There are various sources of selenium, including ores containing the element, usually in the form of selenides; but its particular commercial sources consist of residues or by-product materials; for example the element is contained in the anodic sludge, slime or residue from systems of refining copper, nickel, cobalt and other metals, such sludges usually containing also tellurium and thallium. Another source is from the flue dust resulting from the treatment of pyrites in sulfuric acid manufacture, selenic acid being recovered and then reduced to the element selenium.

The difficult problem of obtaining high-purity selenium is due to its uniquely high reactivity with other elements and compounds, including substantially all of the elements; it being believed that it is able, under special conditions, to combine even with argon, a supposedly inert gas, although only at high temperatures, above 1280°. Among the notable impurities found in commercially produced selenium are the following: Sulfur (M. P. 112.8°; B. P. 444.8°), and from the sulfur group tellurium (M. P. 452°; B. P. 1391°); other impurities including the non-metal arsenic (M. P., sublimes; B. P. 615°); and among the metals notably thallium (M. P. 303.5°; B. P. 1650°).

The general conditions and data being thus stated, the present invention may be first described as starting preferably with the solid material, or commercial selenium, which is rather plentiful on the market, and has considerable use in ceramics but which, for the special technical uses already outlined is too much impaired by impurities to serve with desirable efficiency. It is to be understood however that in practicing the present invention the complete system may commence with the source or raw material, whether an ore or the residue of some other process; in which case the reduction of the raw material to the commercial product might to advantage be thereupon promptly and continuously followed by the purifying steps constituting the present invention.

It is further to be understood that the impure selenium is preferably treated in granular form, by which it is meant that the substance is crushed, ground or otherwise mechanically reduced to a granular or powdery condition; thus facilitating the handling of the material and the reactions thereon. However, the material may as a first step be brought to molten condition and thus fed into the treating apparatus.

The process of the present invention is based upon the discovery that the element selenium can be purified and isolated without recourse to the unsatisfactory chemical or low temperature treatments in solutions already tried, as above stated, but on the principle of distillation, performed at high temperatures and in a particular manner to afford the high-purity product desired; and the present invention is believed to be the first practical instance of high purification of selenium by distillation, involving selective vaporization, separation, condensation, and solidification of the pure element selenium. In general, of course, distillation has been much used in the technical arts for obtaining purified elements or compounds, and even to purify metals, such as mercury, and others of low boiling point, as cadmium, arsenic and zinc; the vaporization temperatures depending on the boiling points and on the impurities present, which also tend to cause brittleness and other objections. But in such cases the operation was practically simple; whereas with selenium, and the same with tellurium, a difficult obstacle existed in the tendency to attack and combine with virtually all known materials, raising such acute problems and complications, in relation to the reaction atmosphere, and to the constitution of the necessary apparatus parts, chambers, etc., and other factors, as to have practically precluded the previous achievement of the results of the present invention, solving the problems mentioned, in the manner hereinafter disclosed. In the case of one particular raw material or ore, wherein selenium has thallium combined with it, a special problem was found to arise in that thallium tends to vaporize and pass along with the selenium at far below its own boiling point; which the present invention avoids.

High temperatures are thus involved in the present invention, requiring a suitable apparatus or furnace, wherein the reaction temperatures at all stages can be predetermined and adjusted and steadily maintained, in accordance with the steps of the process; and wherein combustion is not relied on as a source of heat, the objections of which are such as to render it impractical for the purposes in hand. A type of indirectly heated furnace apparatus useful for the purpose is the electric furnace, and a suitable example thereof is that shown in the Gardner Patent No. 2,195,453, granted April 2, 1940, reissued, No. 22,274, on February 23, 1943. As will further appear it is preferred that two or more successive furnaces be employed, or at least furnace sections separately controllable, interconnected in tandem, so as to present successive chambers or zones wherein may be carried out the successive stages or operations of the process; with separate vapor outlets from the several furnaces, sections, reaction chambers or zones.

Accompanying this specification, and forming part of this application, a flowsheet drawing is appended upon which have been laid out in conventional form diagrammatic representations and written inscriptions indicating the more important and characteristic stages, steps and other factors involved in the preferred embodiments of this invention.

For the continuous production of pure selenium, the starting material or commercial selenium, in granular form, is progressively infed to the furnace apparatus, and caused to travel progressively, and preferably with continuous travel, through the extent of the apparatus, including the several chambers or zones therein, to a final point of discharge of solid or molten residues; while, during the transit of the material it is subjected to controlled high temperatures, in at least two successive steps or stages of treatment, as will next be further described.

In the first stage, as in a first furnace section or chamber, the selenium material is treated to a temperature somewhat below the boiling point 688° of selenium but well above that of arsenic, for example about 660°, or between 620° and 680°. The granular selenium has preferably been pre-mixed with granular or powdered pure graphite or petroleum coke, increasing the body of the material, to the improvement of the process. Sometimes the selenium may be introduced in molten condition, that is, above 200° hot. The first-stage temperature volatilizes the arsenic content as well as any sulfur and any other constituents of boiling points below that of selenium. The vapors thus produced are taken off and flowed away through a suitable conduit, whether to a condenser or other apparatus for recovery, or to other disposal or waste.

In the subsequent or second stage the remaining unvaporized materials are subjected to a higher temperature, somewhat above the boiling point of selenium but well below the boiling points of tellurium, thallium and other expected impurities; the temperature being preferably somewhat below 1000°, such as 850°, or between 700° and 1000°, sufficient to vaporize the selenium while avoiding certain objections encountered by using temperatures above 1000°, such as the possibility of some thallium passing into vapor along with the selenium. Thus, in the second stage the selenium alone is vaporized, and it is taken off and conducted away to the condenser or collection chamber, while the tellurium, thallium and other constituents of boiling points above the reaction temperature travel onward to the furnace discharge, where they may pass out as molten or solid or mixed materials, resembling slag, from which other components may be recovered by supplemental treatments. The Gardner furnace patent shows a flue or outflow conduit 6 leading from the furnace outlet to the condenser chamber; all of which should be exteriorly insulated, or even heated.

The selenium vapor thus flowing out through the outlet conduit of the second furnace or stage, consists of a highly pure selenium, which is flowed along to the hot collection vessel or condensing chamber wherein cooling is permitted, in a gradual manner, to below the boiling point 688° of selenium; following which the liquid material is flowed by a warmed extension conduit from the condenser to a warmed solidifying chamber or mold, wherein also the cooling is allowed in a gradual manner to a point below the melting point 200° of selenium. Preferably the apparatus contains a plurality of condensing chambers for the recovered selenium, which may be used and emptied alternately, and these chambers may feed through separate conduits to a plurality of separate molds, which may be selectively fed so that one mold may be receiving material while another is being cooled and the solid block or ingot of selenium removed therefrom.

The heating means is to be controllable as to furnace chamber temperature, for example in the manner disclosed in said Gardner patent; and the various conduits and receiving chambers are appropriately heated to prevent the selenium vapors condensing prematurely and to prevent the molten material from solidifying before reaching the mold. Each condensing chamber therefore should be maintained at a temperature well below 688° but well above 200°, and each mold somewhat below 200°. In general the heating should be regulated to afford a substantially uniform temperature gradient throughout the system.

The distillation process thus generally described would not be of practical value in an industrial sense without certain further provisions, as will next be described, relating to the special atmosphere that must be maintained within the apparatus; and to the special refractory character of the apparatus parts, walls, linings, flues, chambers and conduits, of non-reactive character in respect to the solid, liquid and vaporous materials handled; as well as to the prevention of leakage of air, gases or vapors into or from the system, requiring provisions to seal tightly all joints.

Thus, the desired results are not obtainable without special provisions in respect to the internal atmosphere. Firstly, it must be free of any components tending to impair the operation or contaminate the purity of the selenium vapors passing from the hot reaction chamber to the condensing and solidifying points; and there must be excluded all traces of air and moisture; also hydrogen gas, and any compounds of nitrogen; also all sulfurous gases such as sulfuretted hydrogen; also all compounds of tellurium; also arsenic and phosphorus; and all hydrocarbon gases. It is preferable, although not always essential, to use atmospheric pressure rather than subatmospheric pressure; and as far as now determined the only practically operative and successful atmospheres for the purpose consist of argon; also nitrogen when extremely pure; also carbon dioxide; these having the advantage that they may be recovered beyond the condenser restored to purity and recirculated in the system, with resulting economy. Argon is particularly suitable, at the operating temperatures described, within which it has no tendency to combine with the selenium. Pure nitrogen is equally inert in that selenium does not react directly with it in the absence of moisture, air and oxygen and of any substance tending to form a nitride or other nitrogen compound. Carbon dioxide is satisfactory, being very stable up to 1000° and higher, but it should not be used at subatmospheric pressures low enough to promote decomposition of the gas. With the argon atmosphere mentioned may be included other rare gases of the inert zero group, helium being the second best in a practical sense. While the reaction atmosphere is to best advantage maintained at sea-level pressure, or may be at partial vacuum as indicated, there may in some cases be an advantage in a slight positive pressure.

The desired atmosphere or gas, as argon, is preferably introduced and maintained as a stream or current, after being first flowed through the apparatus awhile to scavenge all air, moisture and other undesirables. While the argon or other gas might be supplied through the infeed 5 of the Gardner patent, leading into the furnace or first stage, along with the dry selenium material, it is preferred to blow the gas into the apparatus near the other or final discharge end, as by the pipe 6ª entering the vapor flue F at its bottom end, as shown in said patent, thus effectively providing an inert atmosphere from furnace to condenser and excluding air inflow by way of the top-end inlet.

As a further element in a successful procedure it is desirable to insert between the second stage or reaction chamber of the furnace and the condensing chamber a filter trap, through which the selenium vapors must pass and which is adapted to absorb impurities therefrom; such a trap consisting preferably of porous carbon blocks of high purity and high absorptive capacity, which should be regularly renewed.

Another provision essential to the full results sought is the avoidance of reactions by which selenium may combine with the composition or substance of various furnace and other parts, including the interiorly exposed walls and linings of furnace chambers or zones and all other containers, chambers and molds, and all tubes, flues and conduits, and including also the interior feeding device or member 4 illustrated in said Gardner patent.

These parts, to prevent the contaminating reactions, must be constructed of one or more of a limited number of substances, of which the preferred ones are the following, to be of high purity: graphite, petroleum coke and carbon. By such construction, and at the temperatures involved, selenium, although having strong combining properties, is prevented from attacking such walls, linings, etc., with the formation of selenides, causing impurities in the flowing vapor. In lieu of the three carbonaceous solids mentioned there may sometimes be employed silicon, or silicide of carbon, or the highly stable carbides of zirconium or tantalum or chromium. The furnace chamber wall or its lining may also be constructed of or coated with tellurium, this being useful as an effective insulator of heat and being free of tendency to react with graphite or other carbon material, and which otherwise is satisfactory at temperatures not over 1000°.

In order to preserve uncontaminated the selenium atmosphere passing through the apparatus, from furnace to condenser and beyond, the various joints and connections should be sealed and rendered gas-tight. For this purpose a non-reactive sealing compound may be employed consisting of finely-powdered graphite mixed intimately with petroleum pitch. This sealing composition may be improved by adding some powdered tellurium. The compound should be coated on to the joint while hot, and permitted to cool slowly in order to prevent cracking. Moreover this compound is suitable for coating the inside surfaces of the walls, especially carbonaceous or other walls which may otherwise have sufficient porosity to admit some leakage into the interior.

*Example*

As an illustrative example carrying out the present invention, the process steps were as follows, yielding the desired high-purity selenium. Commercial selenium containing 12 percent impurities was in this example treated to distillation in a furnace constructed of graphite and of the character of that shown in the Gardner patent above identified, but with two furnace chambers or zones in tandem between infeed and final discharge. By analysis the impurities were:

|  | Per cent |
|---|---|
| Tellurium | 9.9 |
| Thallium | 0.2 |
| Arsenic | 0.15 |
| Copper | 0.3 |
| Selenous oxide | 0.8 |
| Lead | 0.25 |
| Others | 0.4 |
| Silver | Trace |

The granular material was fed in continuously at the top and caused to pass through two stages of heat treatment, with a first stage at about 660°, during which most of the constituents melted, while the arsenic was volatilized, flowed away and disposed of. In the second stage the temperature was raised to about 850°, causing the volatilization of the selenium only, which was conducted away to the condenser, where it became liquid, and eventually to the mold in which the material became solid. The tellurium and thallium content, and part of the other impurities, were left behind in the furnace and after passing beyond the hot chamber passed onward to the discharge, acquiring under the cooling effect the appearance of a slag.

By these steps selenium of purity above 99.98 percent was obtained, the recovery of selenium being almost total, less than 0.5 percent being not accounted for.

The following preferred factors are important, and were followed in said example. (1) To the infeed of the furnace was fed granular commercial selenium well mixed with a non-reactive carbonaceous material, either pure graphite in powdered form or petroleum coke; which mixture was continuously fed into the first furnace or hot zone, wherein the high temperature was well maintained below the boiling point of selenium and preferably about 660°, and thence along into the next zone or section wherein the temperature was maintained below the boiling points of tellurium and thallium, and preferably somewhat below 1000°. (2) All of the ingredients of the mixture were previously thoroughly dried, and no air or moisture or other undesirable gases were permitted entry to the reaction chamber or subsequent parts of the apparatus. (3) The process was operated with not too great rapidity; and the travel through the furnace apparatus was downward as preferred in said Gardner patent, governed by the disclosed travel-controlling device or feed-screw. (4) The pure selenium vapor, drawn off from the second zone was condensed in a special chamber and then flowed into the molds under the conditions already described, including exclusion of air and moisture throughout, even to the solidifying place. The tellurium and other constituents with boiling points above that of selenium were passed out in molten or solid condition at the furnace discharge, adapted to be subjected to further treatments for the recovery and separation of for example tellurium, in the manner described in a copending application.

The described continuous method may be continued by providing a further hot chamber or chambers, of progressively higher temperatures, e. g., a third chamber at about 1400° to 1440° to vaporize tellurium for its distillation and isolation. If thallium also be present (B. P. 1650°) and such impurities as bismuth (B. P. 1450°), one of the additional chambers or zones may have a temperature of about 1500 to 1600° to deliver the vapor of bismuth and dispose of this element followed by a chamber at about 1700° to vaporize thallium for separate condensation, any other residues going to the slag discharge.

Referring further to the thallium factor or problem in the purification of selenium or tellurium, this presented much difficulty. Thallium is often found with the other elements in the same supply sources, as in anodic sludges, flue dust; and especially in admixture with the other elements in the tank contents of lead refineries. Like selenium and tellurium, thallium has a tendency to combine with practically all elements. Exceptions are vanadium, boron, carbon and silicon, again approaching selenium or tellurium. Thallium further is indifferent to hydrogen. It reacts with metals, forming numerous compounds. Thallium's relation to lead is very pertinent; as it forms alloys therewith which have a higher melting point than either; and these alloys are very stable and not vulnerable to attack even by energetic reagents. Thallium is physically sensitive to light, especially light of long wave length or beyond the visible red of the spectrum, as shown by the research of Majorana and Todesco in 1928, the maximum response occurring at a wave length of about 1.05 $\mu$.

To isolate selenium from thallium is quite practical by the present invention, their boiling points being far apart, namely, 688° and 1650°. In this connection it is observed that if a thallous or thallic salt be reacted with hydrogen selenide, in an organic solvent, there results thallium selenide having the formula $Tl_2Se$. Separating from thallium the element tellurium is more difficult, tellurium having a boiling point of 1390° against 1650° of thallium, and due to the tendency of thallium in such combination to go over with the vapor of tellurium below its own boiling point, and these elements being capable of forming three different compounds; but this separation is practicable with the present distillation process if the principles and reactions are carefully followed.

*Practical uses of pure selenium*

In addition to the several industrial or commercial uses of the purified element as hereinabove mentioned are certain others worthy of mention wherein the high degree of purity is an important factor.

One of these uses is in the manufacture of optical glass, lenses, prisms and the like, wherein the selenium affords high colorless or white transparency to the glass, dependent to a substantial degree upon the purity of the selenium material.

Another selenium utility is for catalytic purposes; several such catalysts being recited and their actions described in heretofore filed copending applications. For example selenium catalysts are useful to promote oxidizing reactions, as of hydrocarbon substances, whether under alkaline or an acid condition. Instances of such catalysts are pure tin selenide $SnSe_2$, and thallium selenide $Tl_2Se$; or a combination of these two. Thallium selenate $Tl_2SeO_4$ is also useful. Selenium itself in pure state may be dispersed or dissolved in an alkaline or acid solution and there become converted to a special form affording high oxidation catalysis. For example, the selenium may be dissolved in an alkaline solution where it becomes partially oxidized to selenium dioxide $SeO_2$. This forms a combination catalyst in which the two parts provide an established equilibrium believed to be correctly represented by the following formula:

$$Se + SeO_2 \rightleftarrows SeO_2 + Se$$

This was referred to as an oscillating action, atoms of oxygen jumping across from molecule to molecule, thus becoming momentarily free of atomic oxygen, during transit, and so having high oxidation properties. The oscillating catalyst so described was improved by adding to it a silver salt catalyst, such as silver tartrate, permitting operations at lower temperatures. In lieu of the combination catalyst thus described, or in mixture therewith, the solution may be provided with silver selenide $Ag_2Se$, which may become partially converted to afford an analogous oscillating catalysis action.

This application constitutes a companion case to applicant's copending application No. 473,115, for production of pure tellurium.

I claim:

1. The continuous process of producing substantially pure selenium from impure selenium-containing material containing impurities of lower boiling point than selenium and impurities of higher boiling point than selenium, comprising causing the impure selenium-containing material to travel through an indirectly heated furnace having successive interconnected zones wherein the impure selenium-containing material is subjected to selective distillation, first introducing the said material into the first of said successive zones and maintaining the temperature within the said zone below the boiling point of selenium but sufficient to vaporize the lower boiling point impurities, conducting the vaporized impurities away from the first zone, conducting the unvaporized selenium-containing material into the succeeding zone, maintaining therein a temperature at which selenium vaporizes but below that at which the higher boiling point impurities are vaporized, conducting the selenium vapor away from the unvaporized residue contained in said succeeding zone to a condenser maintained at a temperature at which selenium condenses but above that at which solidification takes place, and finally conducting the condensed selenium to a mold to solidify the selenium.

2. The process as in claim 1 wherein the unvaporized residue containing tellurium and higher boiling point impurities is conducted from the zone in which selenium is vaporized to a succeeding zone, maintaining the temperature in said succeeding zone above that at which tellurium vaporizes and below that at which the higher boiling point impurities are vaporized, conducting the vaporized tellurium to a condenser to condense the tellurium, and finally solidifying the condensed tellurium.

3. The continuous process of producing substantially pure selenium from impure selenium-containing starting material containing impurities of lower boiling point than selenium and impurities of higher boiling point than selenium, comprising causing such impure selenium-containing starting material to travel progressively through an indirectly heated furnace having successive interconnected zones wherein such impure selenium-containing material is subjected to successive vaporizations, namely, first, feeding the said starting material into the first of said successive zones, and maintaining the temperature within said first zone below the boiling point of selenium but sufficiently high to vaporize the impurities of lower boiling point, conducting the vaporized impurities away from the first zone, progressing the residual unvaporized selenium-containing material from the first into the second of such zones and maintaining in such second zone a temperature at which selenium vaporizes but below that at which the impurities of higher boiling point are vaporized, conducting the selenium vapor away from the unvaporized residue contained in said second zone to a collecting means comprising a condenser maintained at a temperature at which selenium condenses into a liquid, and finally solidifying the condensed selenium.

4. The process as in claim 3 wherein the impure selenium-containing starting material contains also tellurium and wherein the unvaporized residue containing tellurium and higher boiling point impurities is conducted from the zone in which selenium is vaporized to a succeeding third zone, maintaining the temperature in said third zone above that at which tellurium vaporizes and below that at which the yet higher boiling point impurities are vaporized, conducting the vaporized tellurium to a condenser and therein condensing the tellurium, and finally solidifying the condensed tellurium.

5. The process as in claim 3 and wherein the impure selenium-containing material is in granular form in mixture with a pure carbon material selected from the group consisting of graphite and petroleum coke.

6. The process as in claim 3 and wherein the impure selenium-containing material is introduced in pre-molten form.

7. The process as in claim 3 and wherein the selenium vapor taken off from the said succeeding second zone is treated supplementally by passage through a filter trap consisting of bodies of highly pure carbon absorbent to impurities.

8. The process as in claim 3 and wherein the selenium-containing material contains among its impurities of lower boiling point than selenium at least one of the elements of the group consisting of sulphur and arsenic.

9. The process as in claim 3 and wherein the selenium-containing material contains among its impurities of higher boiling point than selenium at least one of the elements of the group consisting of tellurium and thallium.

10. The continuous process of producing substantially pure selenium from impure selenium-containing starting material containing impurities of lower boiling point than selenium and impurities of higher boiling point than selenium, comprising causing such impure selenium-containing starting material to travel progressively through the successive tandem-connected zones or chambers of a high-temperature electric furnace the elements of which become heated to incandescence by the passage of the current, under temperature control within the respective zones, the developed heat being transmitted through the zone walls to the materials traveling progressively therewithin, whereby such impure selenium-containing material is subjected to vaporizations at progressively rising temperatures in the successive zones, including first, feeding the said starting material into the first of said successive zones, and maintaining the temperature within said first zone below the boiling point of selenium but sufficiently high to vaporize the impurities of lower boiling point, and continuously conducting the vaporized impurities away from the first zone, progressing the residual unvaporized selenium-containing material from the first into the second of such zones and maintaining in such second zone a temperature at which selenium vaporizes but below that at which the impurities of higher boiling point are vaporized, conducting the selenium vapor away from the unvaporized residue contained in said second zone to a collecting means comprising a condenser maintained at a temperature at which selenium is cooled to condense into a liquid, and finally cooling further to solidify the condensed pure selenium.

DANIEL GARDNER.